United States Patent
Steiner

[11] Patent Number: 6,152,060
[45] Date of Patent: Nov. 28, 2000

[54] HOOKER CLEAT

[76] Inventor: George Steiner, 58 Hillcrest Avenue, St-Pierre, Quebec, Canada, H8R 1J2

[21] Appl. No.: 09/450,896

[22] Filed: Nov. 29, 1999

[51] Int. Cl.[7] .............................. B63B 59/02; A44B 1/04
[52] U.S. Cl. ..................... 114/219; 114/218; 24/115 R
[58] Field of Search ..................................... 114/115, 218, 114/219; 24/129 A, 129 B, 129 D, 130, 131, 115 R

[56] References Cited

U.S. PATENT DOCUMENTS

| | | |
|---|---|---|
| 1,072,556 | 9/1913 | Wood . |
| 4,280,435 | 7/1981 | Loomis ..................................... 114/219 |
| 4,404,712 | 9/1983 | Northe et al. .......................... 24/129 R |
| 5,493,983 | 2/1996 | Hurt ......................................... 114/364 |
| 5,660,133 | 8/1997 | Munich ................................... 114/219 |

*Primary Examiner*—S. Joseph Morano
*Assistant Examiner*—Patrick Craig Muldoon
*Attorney, Agent, or Firm*—Dowell & Dowell, P.C.

[57] ABSTRACT

A mounting connector for suspending articles such as fenders from the life lines and life rails in boats provides a secure attachment while enabling rapid disengagement or adjustment in the position of the fender. The mounting connector includes a hook arrangement which hooks onto the life line or life rail and includes a blocker which can be inserted into the hook to prevent accidental disengagement. The fender line passes through two closely spaced parallel holes in the body portion of the connector and can be readily adjusted lengthwise relative to these holes when the connector is moved to a horizontal position, but which bind with such holes when in normal suspended condition.

20 Claims, 12 Drawing Sheets

HOOKER CLEAT

FIELD OF INVENTION

This invention relates to a new or improved mounting connector or like device for hanging fenders from life lines and life rails of boats, hanging anchors of the Danforth type from pushpits and pulpits and hanging drink holders from life lines.

DESCRIPTION OF THE PRIOR ART

Fenders are used to protect the hull of a boat when it comes alongside a dock or another boat. Fenders exist in various shapes and sizes and they are hung on the life lines or the life rail of boats using a length of rope of a few feet. Fenders frequently have to be adjusted to different heights or placed at different sides of the boat. The chore of tying, untying, and adjusting the length of the rope is a bother to the majority of boaters and a variety of means have been tried to avoid this.

Anchors of the Danforth type are frequently tied to the pushpit or pulpit of sail boats by the anchor stock using a makeshift arrangement of knots or by devices made of stainless steel that are clipped to the rail.

When socializing in the cockpit of a sail boat and even when underway it is desirable to hang a drink holder on the lifeline that nevertheless remains vertical regardless of the movement of the boat. Since the movement of a sailboat may be both fore and aft and left to right at the same time, such a drink holder must compensate for both movement at the same time. The traditional method is to gimbal the drink holder if it is to remain stationary. This works well only when the gimbal mechanism is well constructed and balanced: a costly undertaking.

Figure 1:
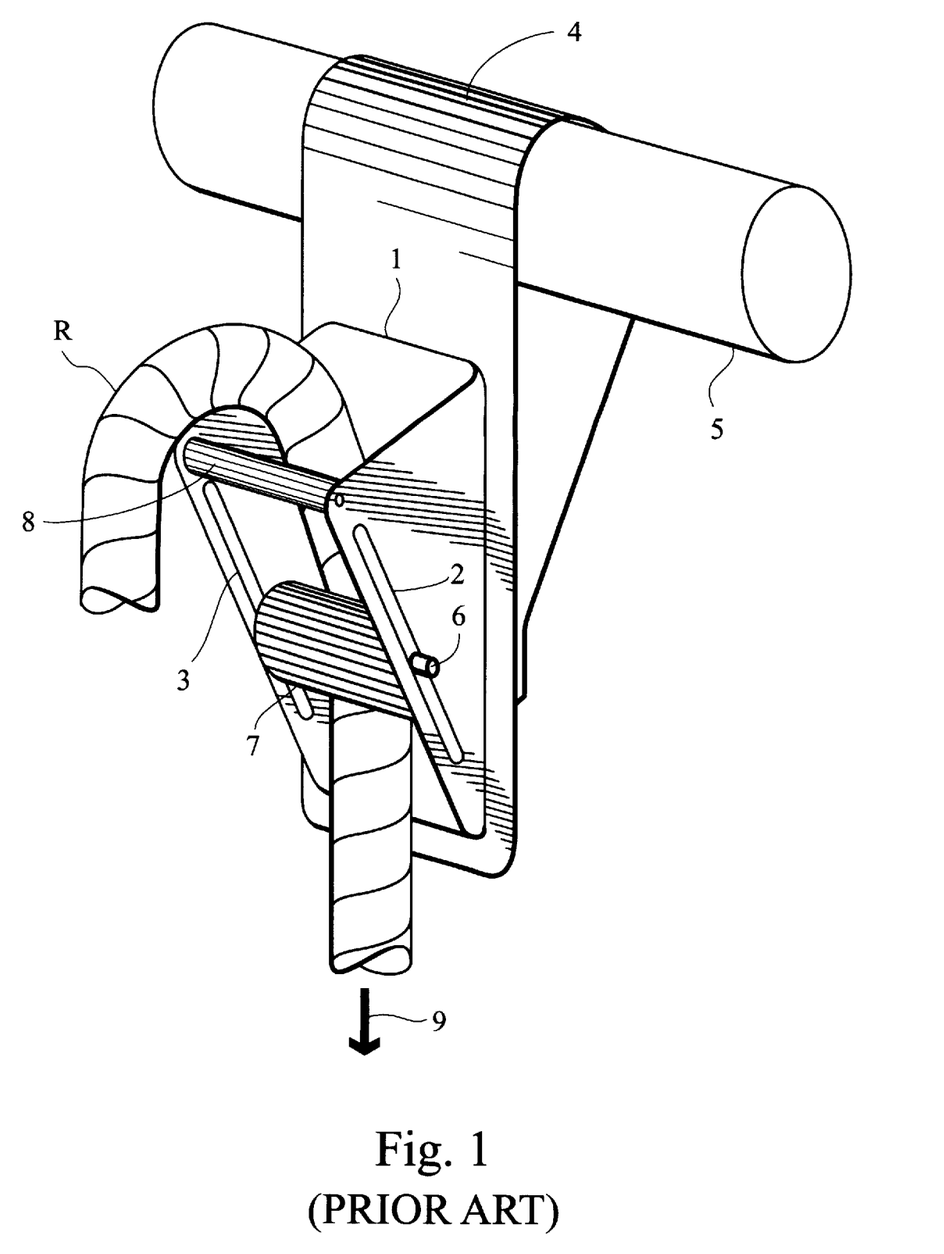
FIG. 1 is a perspective view of an existing device for adjusting a fender rope length and attaching a fender to a life line or a life rail.

In the prior device of FIG. 1 of the accompanying drawings the rope 10 is wedged in a U shaped metal bracket 1 by a serrated roller 7 moving in angled slots 2 and 3. The weight of the fender in the direction of the arrow 9, at the end of the rope R holds the rope jammed as long as the fender is suspended.

Bracket 1 is attached to a flexible plastic loop 4 that is clipped on to a life rail 5 or a life line. Such a device will hold the rope at its adjusted length only as long as the rope is under tension.

If the device is detached by un-clipping the plastic loop and thrown into a locker together with the fender or separately, which frequently happens, the adjustment is undone. Furthermore, to un-clip the plastic loop is not easy. Moreover the device consists of many components, making it costly to manufacture.

Figure 2:
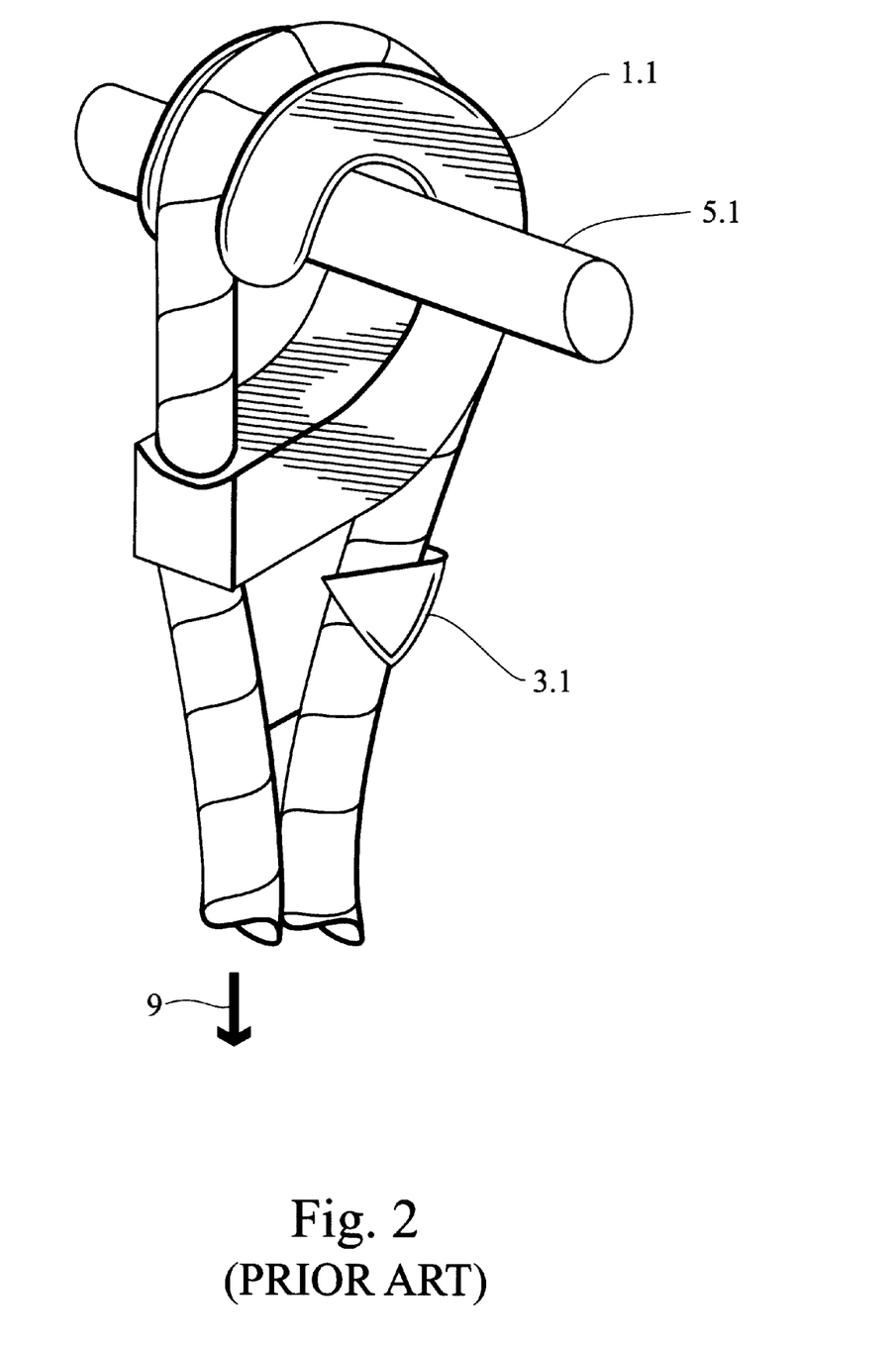
FIG. 2 is a perspective view of another existing device for adjusting a fender rope length and attaching it to a life rail.

In the device of FIG. 2 the rope R is threaded around a hollow hook 1.1 and jammed by the jam cleat 3.1. The hollow hook is first clipped on to the life rail 2.1 after which the rope R is threaded. The arrow 4.1 shows the direction of the fender attachment. This device while simple and low cost is clumsy to adjust and remove.

There are other devices combining elements of the two described above in a variety of ways, none satisfactory.

The objective of the present invention is to provide a one-piece connector device which: will allow quick adjustment of the fender rope length; will enable the device to be hooked on to or removed from the life rail or life line quickly; will ensure the rope is fixed in the device securely in the adjusted position; and which will remain securely hooked to the life rail or life line.

Another objective of the present invention is to hang a Danforth type anchor from pulpits or pushpits securely and to allow detachment of the anchor easily.

Yet another objective of the present invention is to hang drink holders from life lines of sail boats so as to keep the holders vertical at all times regardless of the motion of the boat.

SUMMARY OF THE INVENTION

The invention provides a mounting connector for suspending articles from an elongate support in the form of a life line, life rail, pulpit or pushpit of a boat said connector comprising: a hook portion for engaging the elongate support and a body portion for connecting to a suspended article; said hook portion comprising two inverted U-shaped fingers spaced from each other by a slot, each finger terminating in a free end directed towards said body portion but separated from said body portion by an entry gap; each said finger defining a hook pocket that opens from said entry gap and extends away from said body portion to a closed end, each said hook pocket having a width sufficient to accommodate the elongate support, and each said hook pocket having a total length that exceeds the size of said entry gap; said slot separating said fingers apart by a distance corresponding to said width, said fingers extending generally parallel to each other and being oppositely oriented so that said hook pockets are in relative alignment but said entry gaps are not; the structure being such that said connector can be mounted by causing the elongate support to pass into said slot to a depth sufficient to align with said entry gaps, whereupon rotation of said connector relative to said elongate support brings the latter in alignment with said hook pockets so that the mounting connector can be fully engaged by moving it to position the elongate support in contact with the ends of said hook pockets.

To prevent accidental disengagement of the mounting connector from the life line or the like to which it is attached, provision is made for the insertion of a blocking retainer in the slot between the inverted U shaped figures between the body portion of the connector and the life line or the like that is to be retained thus preventing detachment of the connectors since in the presence of the blocking retainer the life line or the like cannot be brought into register with the entry gaps between the free ends of the fingers and the body portion of the retainer. The blocking retainer may comprise the free end of a rope through which the fender is attached to the body portion. Particularly where the connectors designed for attachment to a life line, this rope may be of a diameter larger than the life line and therefore the confronting sides of the U shaped fingers can be recessed to define a somewhat enlarged aperture to receive the rope which accordingly is not easily accidentally displaced from its position acting as a blocking retainer.

A simple means is provided for adjustment of the length of rope between the fender or the like and the mounting connector in the form of a pair of parallel through holes spaced one above the other in the body of the mounting connector. These holes are of a diameter corresponding to that of the fender rope which is threaded successively therethrough. With this arrangement, the weight of the fender acts to bind the rope into engagement with the through holes in the deployed condition, whereas the fender rope length can readily be adjusted by swinging the connector to a horizontal position whereupon the looped portion of the rope can be lifted away from the connector enabling the rope to be fed one way or another through the holes to adjust the fender rope length. The mounting connector can also be adapted to provide a satisfactory means for suspending a drink holder from a life line or the like in a boat. In this application the mounting connector has a second pair of U shaped fingers extending from the opposite end thereof, this second pair of fingers being angularly offset through 90 degrees with respect to the first pair. Accordingly the loop suspended through the second pair of U shaped fingers will lie in a plane at right angles to the life line so that this loop can swing about the connector in one plane whereas the connector can swing about the life line in a second plane at 90 degrees to the first plane.

The invention also provides a mounting connector for suspending articles from an elongate support in the form of a life line, life rail, pulpit or pushpit of a boat said connector comprising: a hook portion for engaging the elongate support and a body portion for connecting to a suspended article; said hook portion comprising an inverted U-shape finger that terminates in a free end directed towards said body portion but separated from said body portion by an entry gap; said finger defining a hook pocket that opens from said entry gap and extends away from said body portion to a closed end, each said hook pocket having a width sufficient to accommodate the elongate support and having a total length of at least twice the size of said entry gap; said finger being configured to receive a blocking retainer inserted therethrough at a spacing from said closed end, such that when said connector is mounted by having the elongate support passed into said slot through said entry and moved to the end of said hook pocket, insertion of said blocking retainer is effective to prevent movement of elongate support back to said entry gap.

The invention will further be described, by way of example only, with reference to the embodiments shown in the accompanying drawings.

DESCRIPTION OF THE PREFERRED EMBODIMENTS OF THE INVENTION

Figure 3:
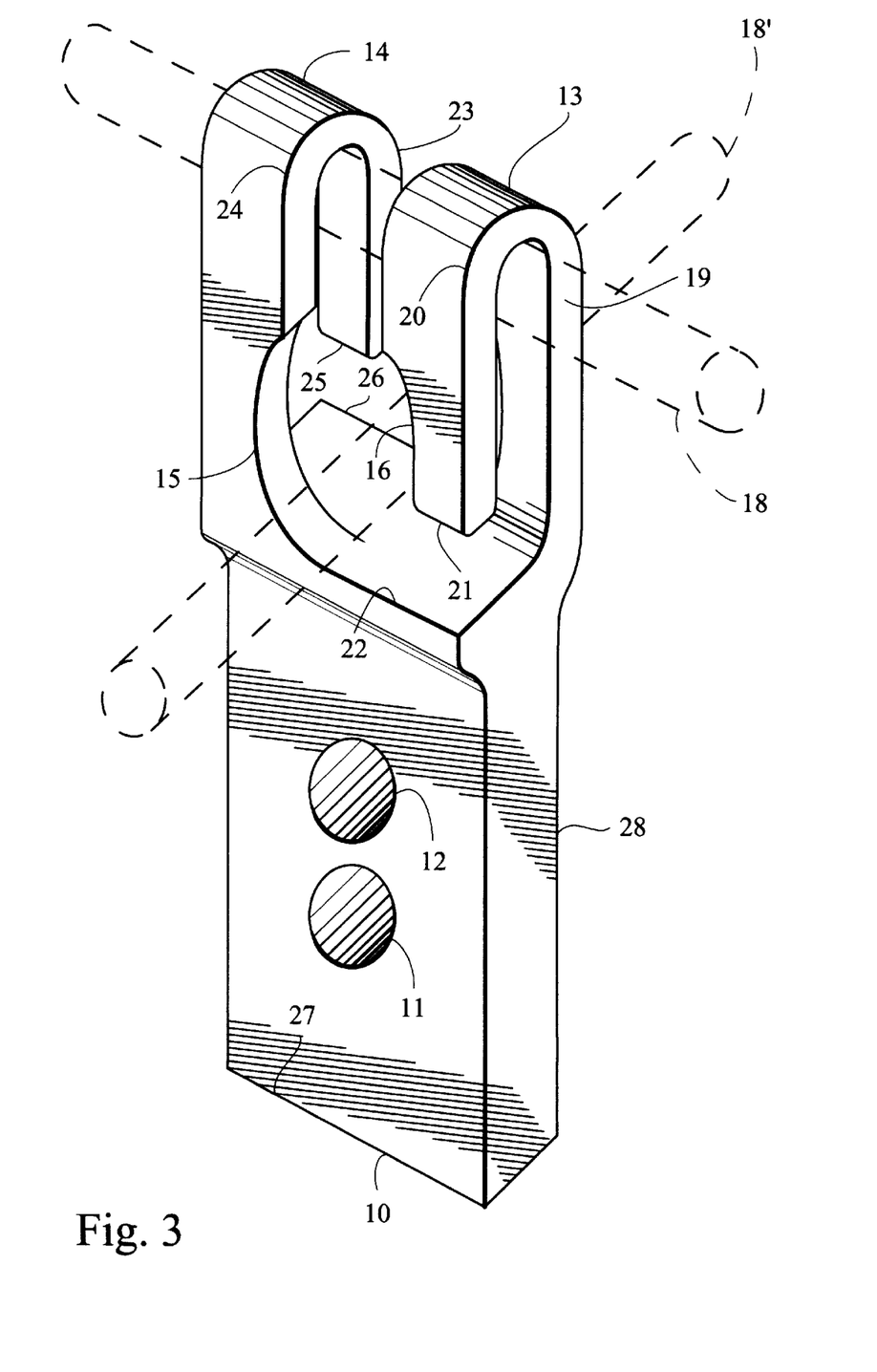
FIG. 3 is a perspective view of a first preferred embodiment of the connector of the present invention for securing and adjusting the fender rope and attaching it to a life line.

FIG. 3 shows the mounting connector device in its normal vertical orientation, intended to hang fenders from life lines. The device 10 consists of a longitudinal rectangular lower body portion having two round holes 11 and 12 adjacent to each other and vertically spaced. The holes 11, 12 are substantially the same size as the diameter of the rope to be used.

The device has an upper hook part having two longitudinal open inverted U shaped fingers 13 and 14 separated from each other by a slot and oriented in opposition by 180 degrees. The gap between the fingers or open loops 13 and 14 corresponds to the diameter of the life line 18 to which the connector is to be hooked.

In each vertical part of the fingers 13, 14 there is a substantially semicircular recess 15 and 16. The recesses 15, 16 form an aperture whose diameter is substantially the same as the largest diameter rope to be used for hanging the fender (not shown).

The inside separation of the two vertical limbs 19 and 20 of the finger 13 is substantially the same as the diameter of the life line. This separation is the same for vertical limbs 23 and 24 of finger 14 also. The vertical distance between the free end 21 of the vertical limb 20 and the upper end 22 of the rectangular lower block is substantially the same as the diameter of the life line. The vertical distance between the end 25 of the vertical limb 23 and the upper end 26 of the rectangular lower block is also substantially the same as the diameter of the life line.

The connector device 10 is attached to the life line 18 as follows, with reference to FIG. 3 of the drawings. In this figure, for ease of illustration, the life line 18 is represented at 18' to show its orientation relative to the connector device 10 at the time of installation. Thus, the device 10 is placed under the life line 18' with the latter aligned with the gap between the fingers 13, 14, and is raised so that the life line moves between the fingers until it is engaged by the upper end 26 of the connector body and the life line is positioned as shown at 18' in FIG. 3. The connector device 10 is then rotated about its length, in a clockwise direction as viewed from above, so that that life line 18 is then aligned with the hook pockets defined between the vertical limbs 19, 20; 23, 24 of the fingers 13, 14 respectively. Thereupon, the connector device 10 is lowered to bring it into the position relative to the life line 18 as shown in FIG. 3, with the closed ends of the loops of the fingers 13, 14 resting on the life line 18. The connector device 10 is removed from the life line 18 by reversing the above procedure.

Figures 4, 5:
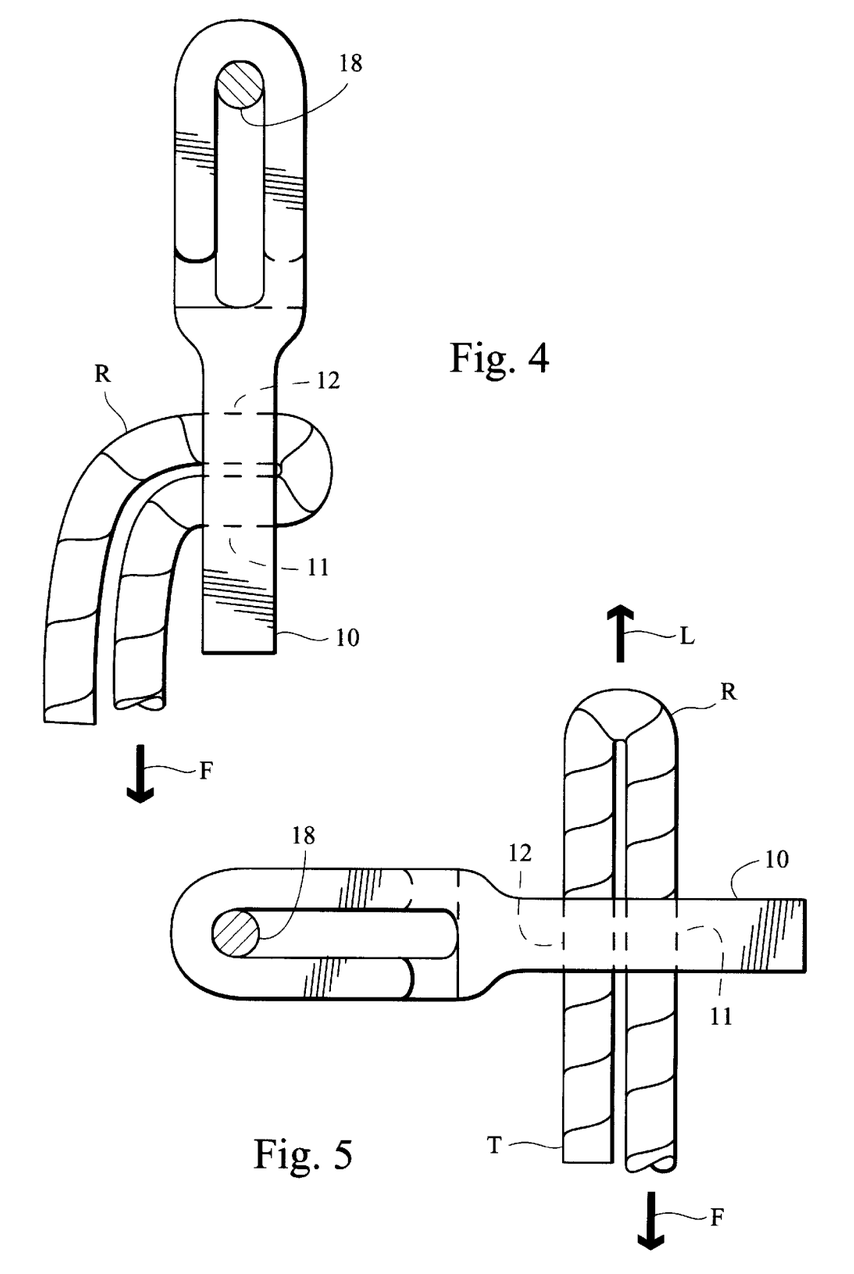
FIG. 4 is a side view corresponding to FIG. 3 showing the connector hooked to a life line and hanging vertically with the fender rope cleated.
FIG. 5 is a view similar to FIG. 4 but with the connector oriented horizontally to show how the fender rope length is adjusted.

FIG. 4 shows the connector device of FIG. 3 suspended on the life line 18 with a fender rope R passed successively through the adjacent holes 11 and 12. The fender (not shown) is suspended from one end of the rope and applies a load to the rope as indicated by the arrow F in FIG. 4. The other end of the rope hangs freely as seen in FIG. 4.

With the connector device 10 suspended vertically as seen in FIG. 4, it will be appreciated that the force F hanging on the rope R will tend to bind the rope to the connector by tightening the rope loop against the side of the connector between the holes 11 and 12, by virtue of the fact that these holes are of a diameter corresponding to that of the rope R.

In this configuration the rope will not slip even if the force F has a magnitude of several hundred pounds.

Figure 6:
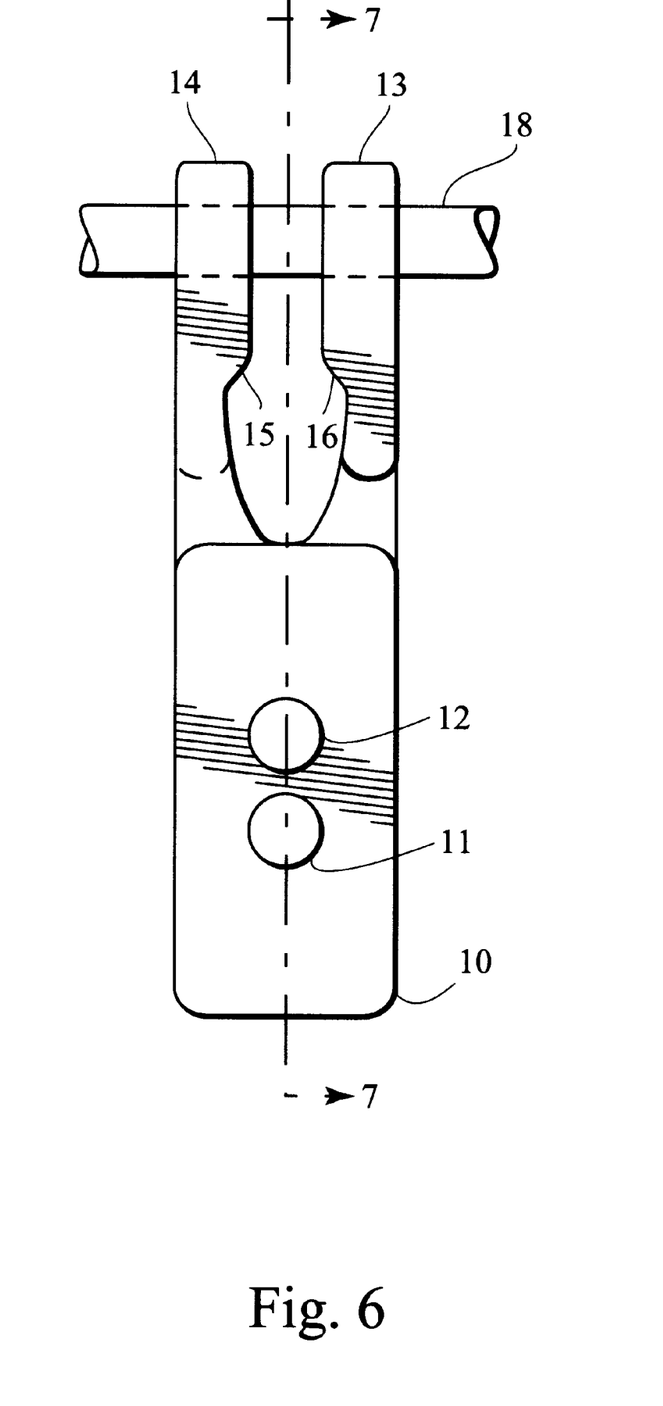
FIG. 6 is a front view of the connector of FIG. 3 to show principally the position of the aperture between the two loops.

However, by rotating the connector 10 angularly about the life line 18 to the position shown in FIG. 5, the position of the fender with respect to the connector 10 can readily be adjusted. In this orientation the doubled over bite of the rope R can be gripped and raised as indicated by the arrow L. Since in the FIG. 6 orientation the ends of the rope are aligned with the holes 11 and 12, the rope no longer binds with these holes and the rope can be fed through these holes selectively in either direction to reduce or increase the length of the rope which extends between the hole 11 and the fender (not shown). Once the desired position has been achieved, the rope R can be restored to the position shown in FIG. 4 relative to the connector 10 so that the weight of the fender interacts between the rope and the connector 10 to retain the fender at the selected position of adjustment.

Figure 8:
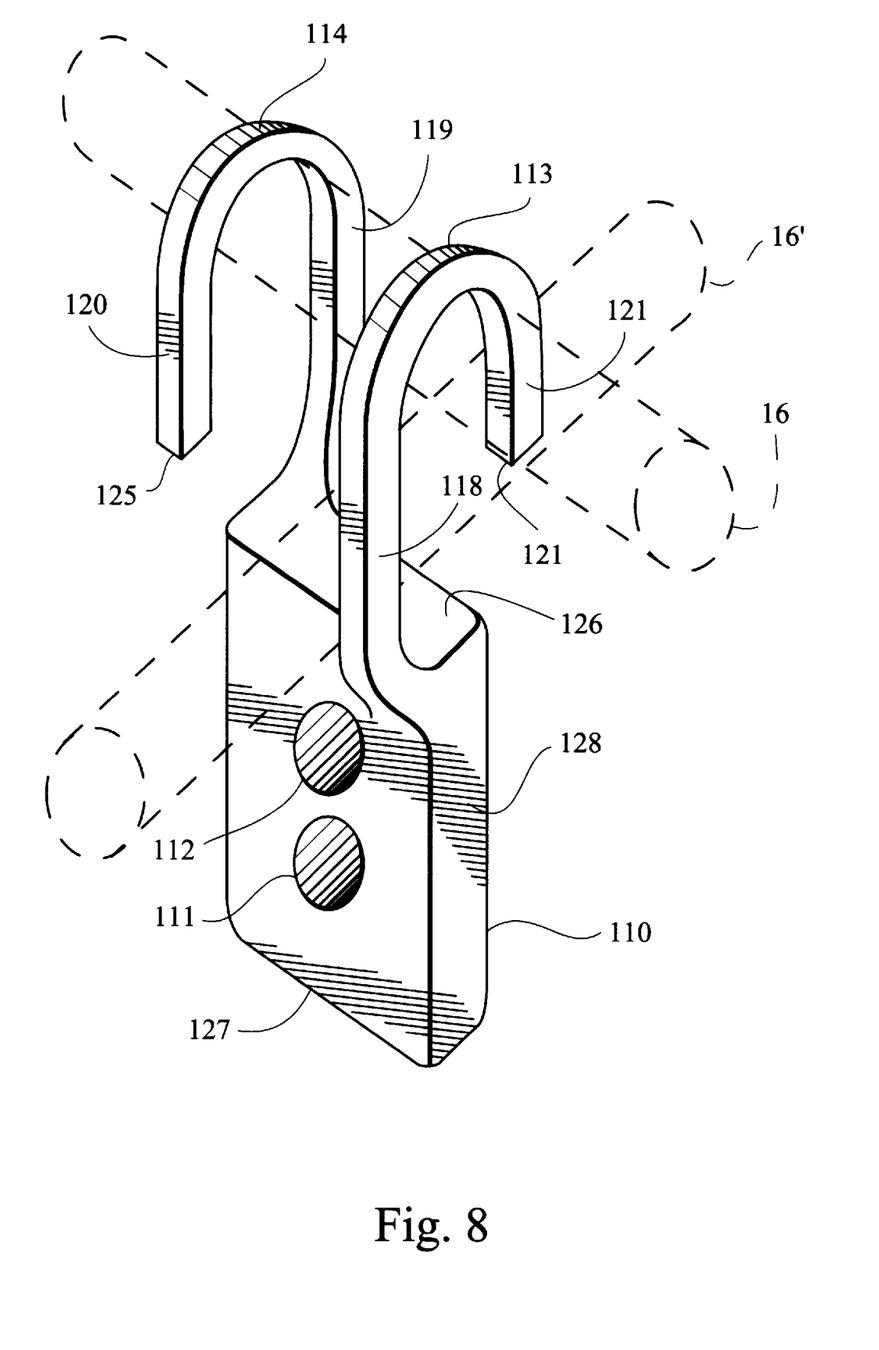
FIG. 8 is a perspective view of a second preferred embodiment of the connector of the present invention for securing and adjusting a fender rope and attaching it to a life rail.

The embodiment shown in FIG. 8 is designed for engagement with a life rail 16, the latter also being shown in this figure in an alternative orientation relative to the connector device 110, this representation being indicated by the reference numeral 16'. The connector 110 is generally similar to the connector 10 of FIG. 3 but is dimensioned somewhat differently to accommodate the relatively greater diameter of the life rail 16 as compared to the life line 18. Thus the connector 110 has an elongate lower rectangular block having two round through holes 111, 112 adjacent to each other and vertically oriented, these holes having a diameter corresponding to that of the diameter of rope to be used to support the fender (not shown).

The upper part of the connector 110 has two looped fingers 113, 114 similar to the fingers 13, 14 in FIG. 3, separated from each other by a gap corresponding to the diameter of the life rail 16, and oriented in opposite directions. Similarly the fingers 113, 114 have limbs 117, 118; 119, 120 respectively which are spaced by a distance corresponding to the diameter of the life rail 16. Similarly, the fingers have free ends 121, 125 respectively which are separated from the upper end of the lower block 128 by a spacing corresponding to the diameter of the life rail 16. The connector device 110 is attached to the life rail in a similar manner to the attachment of the embodiment of FIG. 3 to the life line 18.

Figure 7:
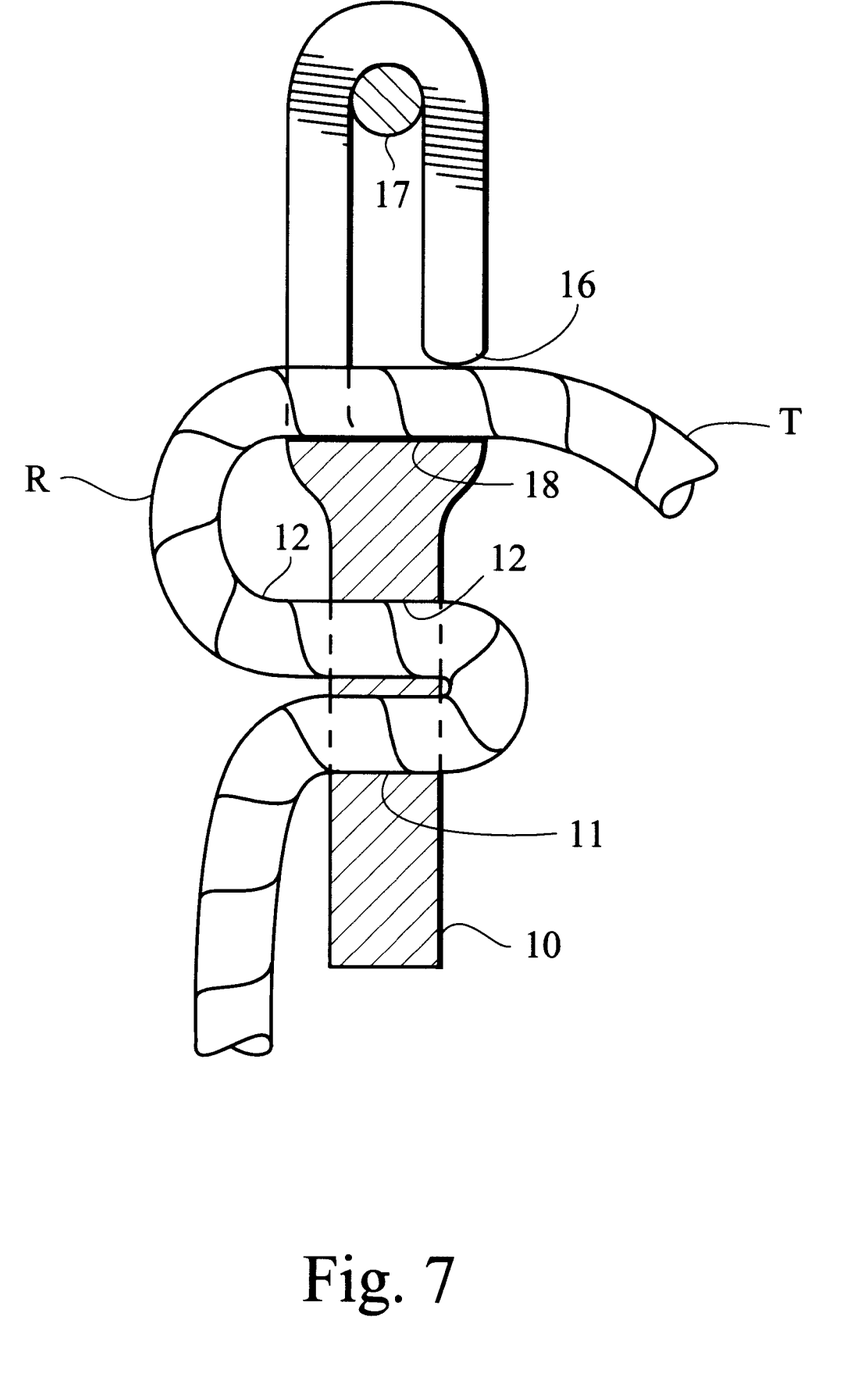
FIG. 7 is a sectional view taken on the line 7—7 of FIG. 6 showing that when the fender rope is looped back through the aperture between the two loops it blocks the connector from unhooking from the lifeline.

From a consideration of FIGS. 3, 5 and 7 it will be appreciated that the tail T of the fender rope R effectively blocks off the lower end of the gap between the fingers 13, 14 and effectively prevents unhooking of the connector device 10 from the life line 18. Thus even if the connector device 10 is raised relative to the life line 18, the latter cannot reach the surface 26 at the root of the fingers (being blocked by the presence of the tail), and therefore cannot pass through the gaps between the tips 21, of the fingers, and therefore cannot be brought into alignment with the slot between the fingers 13 and 14. A similar blocking action is achieved with the second embodiment, as will be clear from FIG. 9.

Figure 9:
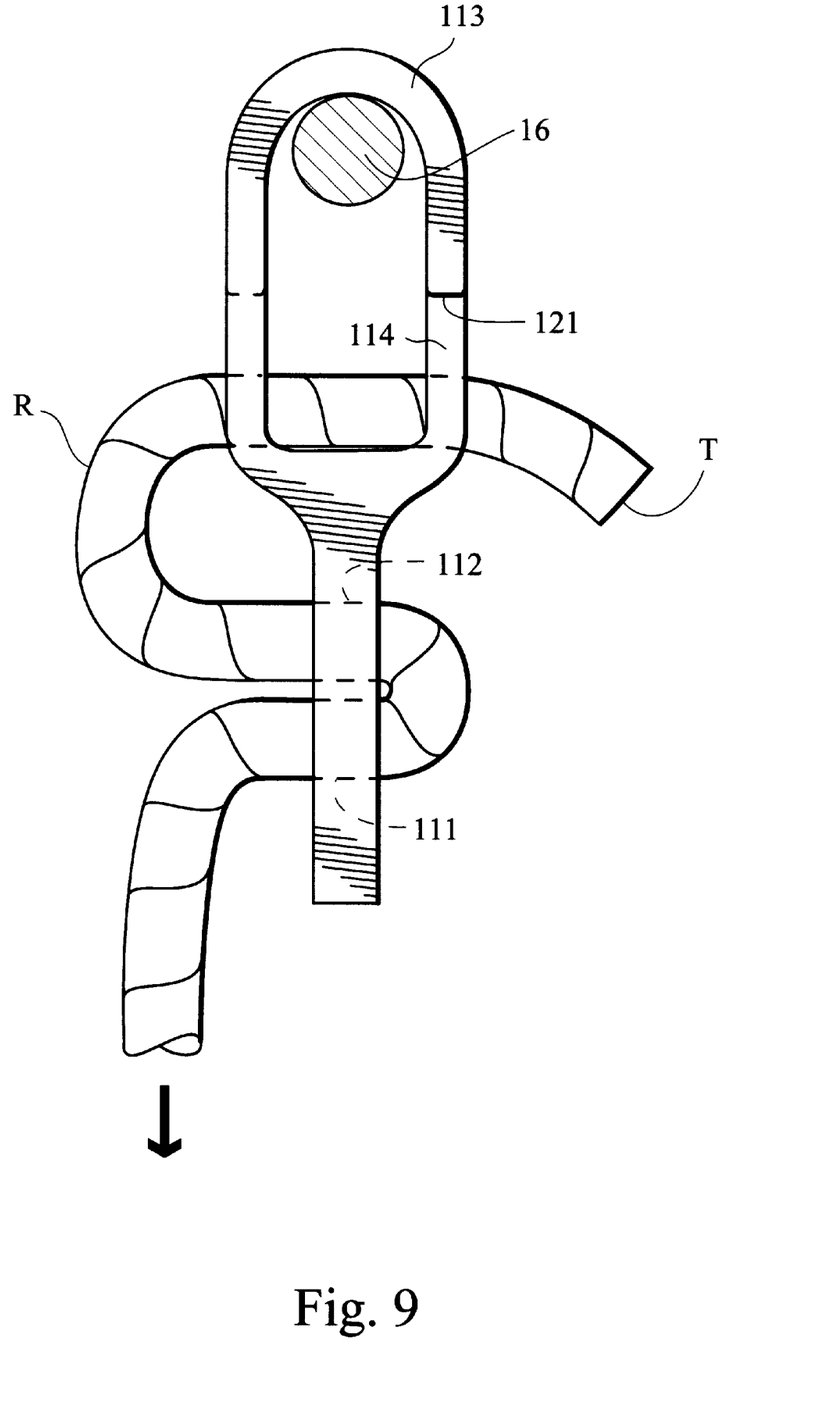
FIG. 9 is a side view of the embodiment of FIG. 4 showing the tail of the line suspending a fender passing between the loops.

In FIG. 9 the connector device 110 of FIG. 8 is shown as mounted on the life rail 16 with a fender (not shown) suspended from the rope R, the rope being threaded through the holes 111, 112 and the tail of the rope being passed laterally between the hook fingers 113, 114. It will be seen from this arrangement that due to the presence of the tail T the connector 110 cannot be detached from the rail 16 despite being raised upwardly, since the presence of the tail T blocks the disengagement.

Figure 10:
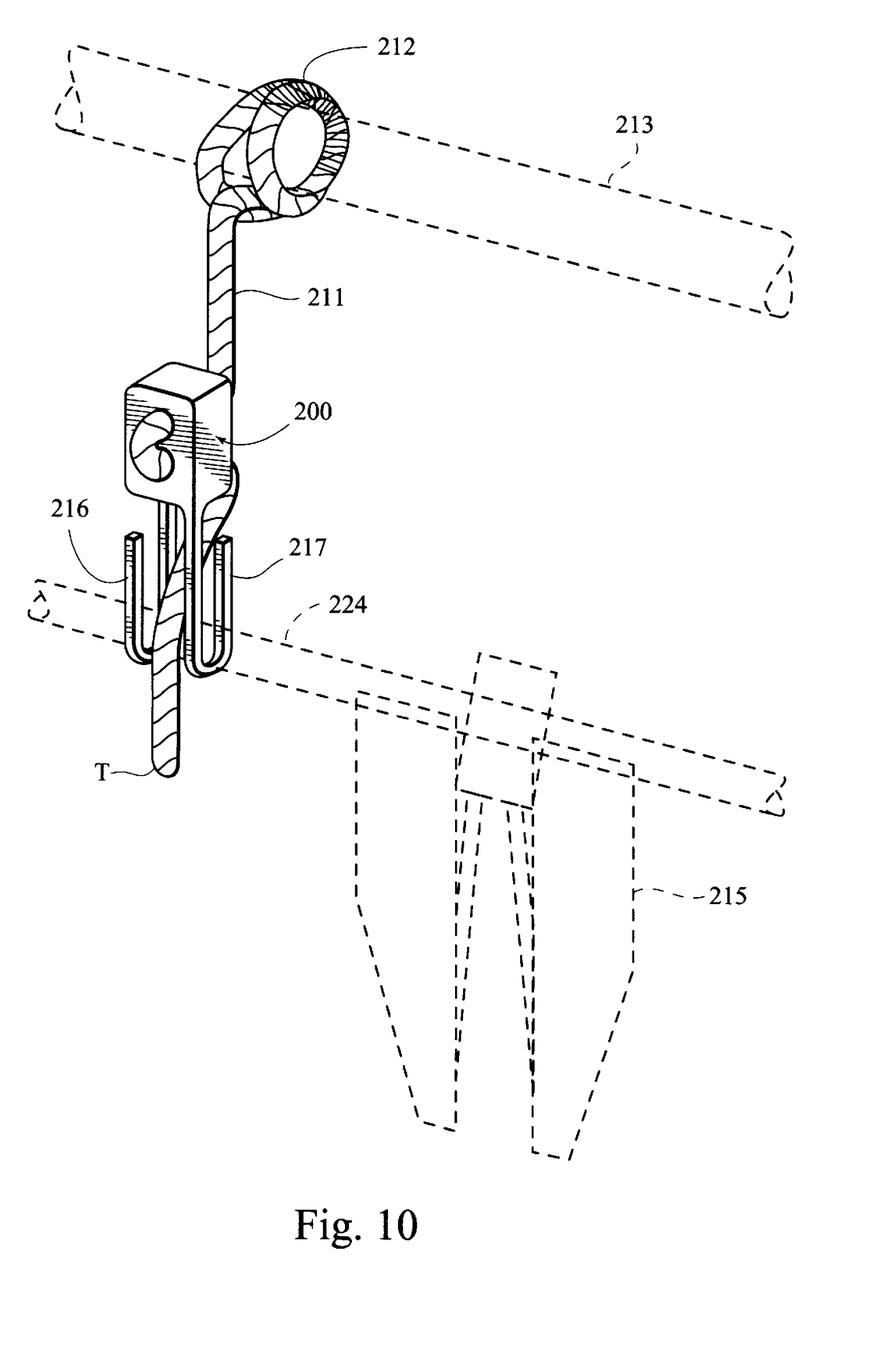
FIG. 10 is a perspective view of a connector in accordance with the present invention holding the stock of a Danforth type anchor suspended from a rail.

FIG. 10 shows the suspension of a Danforth type anchor from a pulpit or pushpit, only one side of the anchor suspension being shown, although it will be realized that two such suspension attachments will be required. As shown in FIG. 10, the anchor stop 224 of the anchor 215 hangs in finger loops 216, 217 of the connector device 200 which in turn is suspended from a rail 213 by a rope 211. It will be seen that the connector device 200 is arranged in inverted condition as compared to the connector 10 as seen in FIGS. 3 to 7. The rope 211 has at its end an eye 212 through which the rope is looped, the rope than being passed through holes in the connector 200 similar to the holes 11 and 12 of the connector of FIG. 3. The rope 211 has a tail T which is passed between the looped fingers 216, 217 and therefore acts as a block preventing accidental disengagement of the anchor stop 224 from the connector 200. It will be evident that the connector device 200 as seen in FIG. 10 is essentially the same as that seen in FIG. 8 except that it is mounted in inverted condition.

Figure 11:
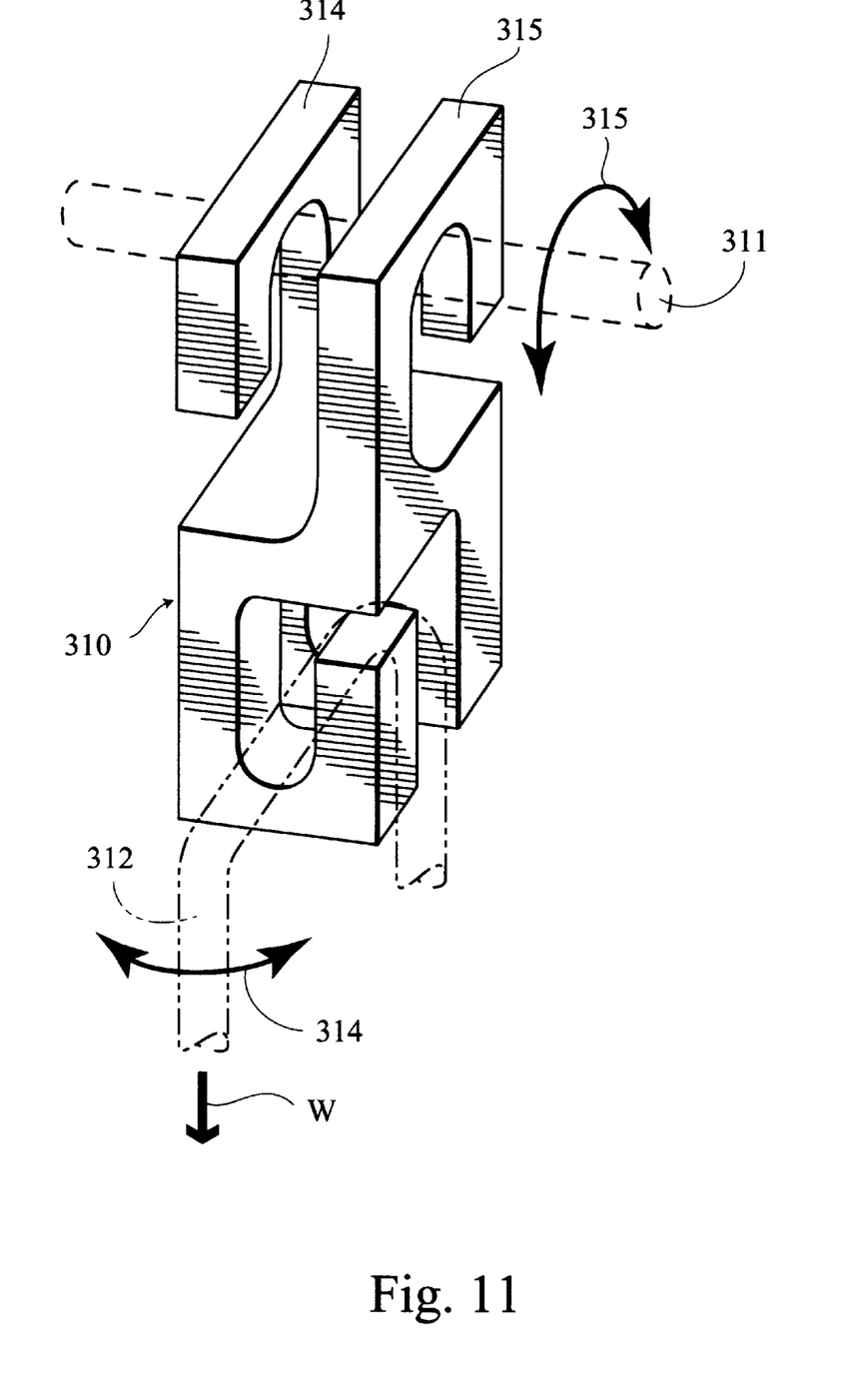
FIG. 11 is a perspective view of a modified connector of the present invention designed to hang drink holders from a lifeline.

FIG. 11 shows the application of the connector of the present invention to provide a support for hanging drink holders on life lines and life rails of boats. As seen in FIG. 11 the device includes two pairs of oppositely directed parallel spaced hook fingers 313, 314 and 313A, 314A respectively, the fingers 313, 314 being angularly offset by 90 degrees with respect to the orientation of the fingers 313A, 314A. The device 310 is shown hooked onto a life line 311, being attached thereto in the same manner as the attachment device 10 of FIG. 3, and the hook fingers 313, 314 being similarly configured in size and dimension in relation to the life line 311.

A drink holder (not shown) is suspended from a looped rope 312 shown in broken lines in FIG. 11 and exerts a load W on the rope 312.

From the foregoing and from a consideration of FIG. 11 it will be evident that the drink holder connector 310 is capable of swinging arcuately about the line 311 as indicated by the arc 315, and that the drink holder is capable of swinging about the upper end of the loop 312 in an arc indicated by the arrow 314 and in a plane lying at 90 degrees with respect to the plane of the arc 315. Accordingly through this compound swinging motion, a drink holder suspended from the loop 312 can remain in a substantially vertical condition despite changes in attitude of the boat on which the life line 311 is mounted.

Figure 12:
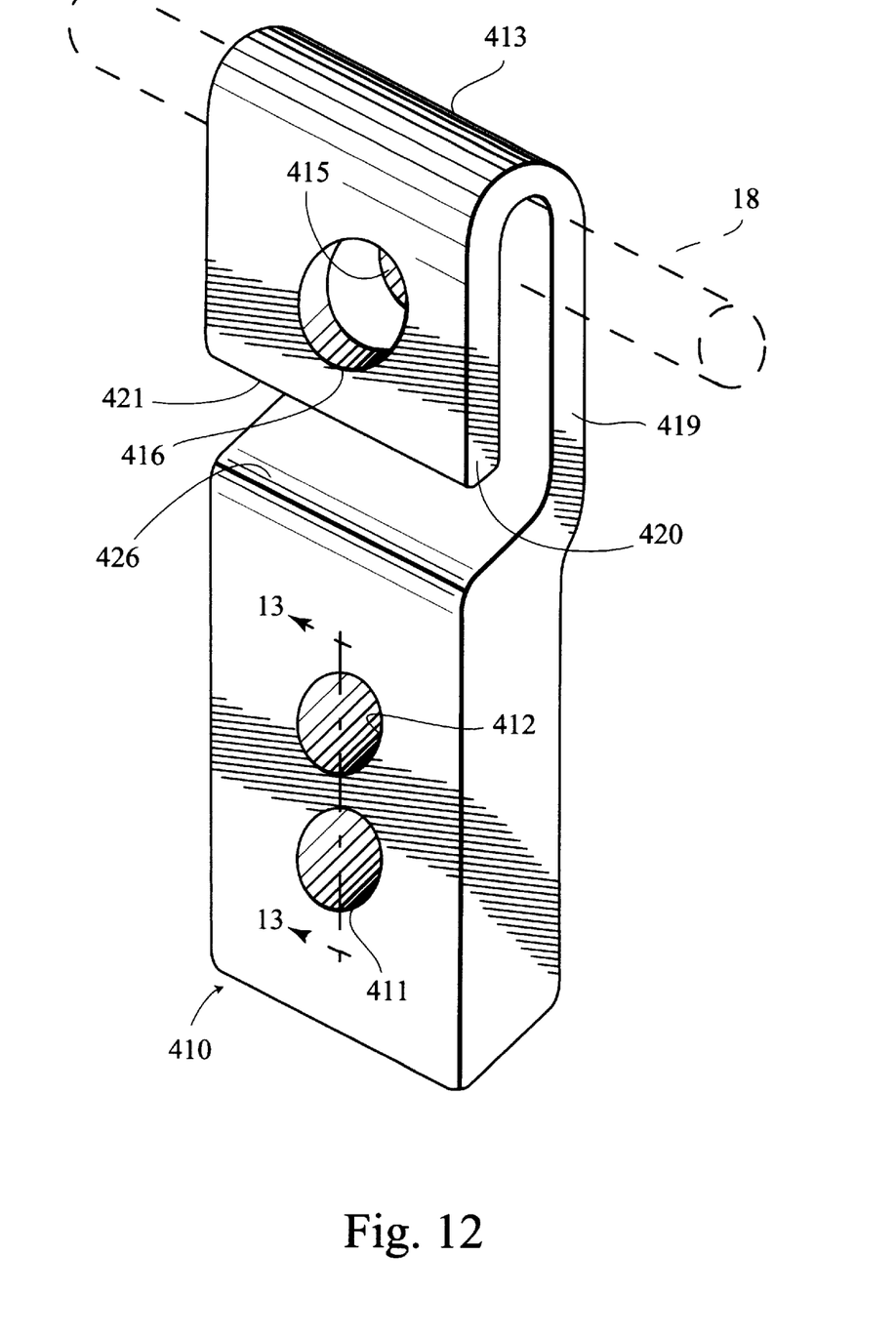
FIG. 12 is a perspective view illustrating a further embodiment of the invention.

The embodiment of the connector device 410 shown in FIG. 12 differs from that shown in FIG. 3 in that it has but a single hook portion 413 formed by spaced limbs 419, 420 which between them define a pocket that is sized to receive the life line 18, the lower end 421 of the limb 420 being spaced from the upper end 426 of the rectangular lower body portion of the mounting connector device 410 by a gap which has a width corresponding to the diameter of the life line 18.

Aligned holes 415, 416 in the vertical limbs 419, 420 have a diameter sufficient to accommodate the line (not shown) by which a fender or the like is to be suspended from the device.

As before, the rectangular lower part of the connector device 410 has a pair of closely spaced transverse holes 411, 412 extending therethrough by means of which the line for a fender or the like can be attached in the manner described in relation to the embodiments of FIGS. 3 to 8.

In normal operation there will be a small but constant lateral movement of the fender suspending line against the lower edge of the lower hole 411. To ensure that the line does not chafe against a sharp edge, the lower hole 411 is formed on each side with a peripheral bead 451 of smooth semi-circular outline so that there is no sharp edge upon which the line can chafe. A peripheral bead like 451 is included in all embodiments of the connector device.

The manner of use of the connector device 410 of FIG. 12 will be self-evident. The device is passed over the life line 18 such that the latter enters through the gap at the lower end 421 of the finger 420 and thus passes into the pocket between the fingers 419, 420 and is moved to the top end of this pocket. Thereupon the tail end of the fender line (not shown) is threaded through the aligned holes 415, 416 thus preventing disengagement of the device 410 from the life line 418.

It will be appreciated that the embodiment of FIG. 12 can be modified by suitable selection of dimensions to provide a connector device for mounting on a life rail, or to provide structure equivalent to the connection device 110 of FIG. 9, or the device 210 of FIG. 10.

Figure 13:
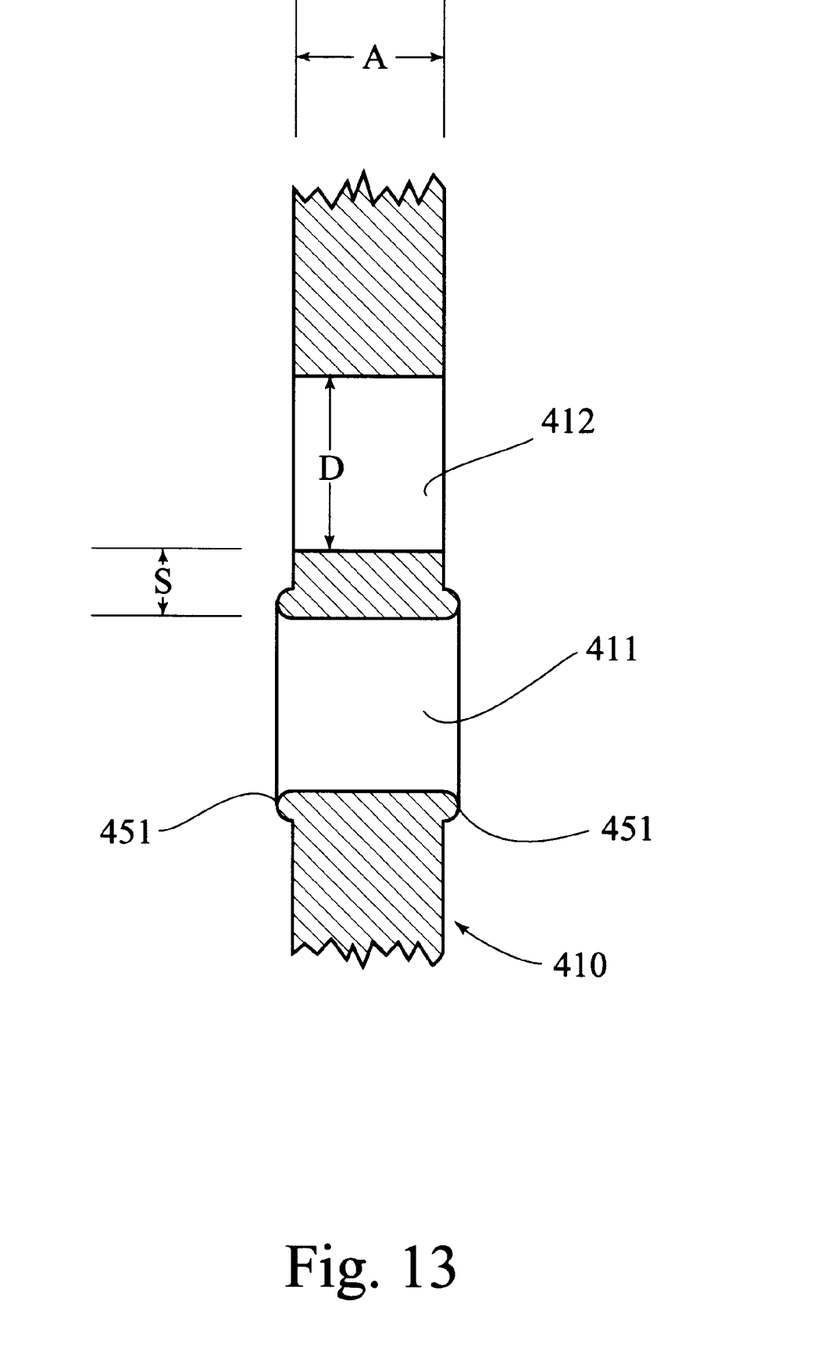
FIG. 13 is a somewhat enlarged fragmentary sectional view taken on the line 13—13 in FIG. 12.

The interaction of the fender rope R with the pair of spaced holes in the body portion of the mounting connector (see holes 11, 12 in FIG. 3; 111, 112 in FIG. 8; and 311, 312 in FIG. 12) will be described in relation to FIG. 13. The hole diameter D will be sized in relation to the thickness of the fender line R that is to be employed and should exceed the line diameter by at least 5% and preferably by 10 to 12%, and may exceed by 12 to 15%. However it should not exceed the line diameter by more than 15% because above that point slippage of a line through the holes can occur.

It is preferable for the pair of holes to be relatively closely spaced since this causes the fender line to be sharply bent between the holes (as seen in FIG. 4) which assists the binding effect. With reference to FIG. 13 the spacing S between the adjacent sides of the two holes should be between 15 and 30% of the hole diameter D, preferably between 20 and 25%.

The thickness A of the main body portion of the device where the holes 411, 412 are located is preferably between 30 and 50%, and most preferably about 40%, of D the diameter of the holes 311, 312. The thickness A should be the minimum thickness which will provide a secure hold upon the fender line without making it excessively difficult to thread the fender line through the holes 311, 312. When the device is in the vertical position as seen in FIG. 5, the load F of the fender on the line R causes the latter to distort at every change in direction, and these distortions cooperate with the mounting device to provide the desired jamming action.

I claim:

1. A mounting connector for suspending articles from an elongate support in the form of a life line, life rail, pulpit or pushpit of a boat said connector comprising:

a hook portion for engaging the elongate support and a body portion for connecting to a suspended article;

said hook portion comprising two inverted U-shaped fingers spaced from each other by a slot, each finger terminating in a free end directed towards said body portion but separated from said body portion by an entry gap;

each said finger defining a hook pocket that opens from said entry gap and extends away from said body portion to a closed end, each said hook pocket having a width sufficient to accommodate the elongate support, and each said hook pocket having a total length that exceeds the size of said entry gap;

said slot separating said fingers apart by a distance corresponding to said width, said fingers extending generally parallel to each other and being oppositely oriented so that said hook pockets are in relative alignment but said entry gaps are not;

the structure being such that said connector can be mounted by causing the elongate support to pass into said slot to a depth sufficient to align with said entry gaps, whereupon rotation of said connector relative to said elongate support brings the latter in alignment with said hook pockets so that the mounting connector can be fully engaged by moving it to position the elongate support in contact with the ends of said hook pockets, said mounting connector being configured to receive a blocking retainer in said slot to prevent unintended disengagement of said connector.

2. A mounting connector as claimed in claim 1 wherein the wall of at least one finger defining said slot has a recess therein at a location spaced away from said free end and positioned to receive said blocking retainer that is insertable transversely through said slot to block the same, said recess being configured to interengage with the blocking retainer and being sized to accommodate a blocking retainer having a thickness exceeding that of the elongate support.

3. A mounting connector as claimed in claim 1 wherein said body portion has two parallel holes extending therethrough and closely spaced from one another generally in the length direction of said fingers, said holes being configured to receive a line that is sharply bent and passed successively therethrough and positioned and arranged so as to bind with said line when an object is suspended on said line, the line when relieved of tension being readily adjustable relative to said holes.

4. A mounting connector as claimed in claim 3 wherein said line is of a larger diameter than the width of said slot, said fingers having on surfaces thereof facing said slot registering recesses to accommodate passage transversely therebetween in the slot a tail end of said line, said tail end thus being positioned in said slot to block movement of said mounting connector to a disengaged position.

5. A mounting connector as claimed in claim 3 wherein at least one of said two parallel holes is surrounded at one end thereof by a rounded peripheral bead.

6. A mounting connector as claimed in claim 3 wherein the diameter of said two parallel holes exceeds the diameter of the line for suspending the object by between about 5 and 15%.

7. A mounting connector as claimed in claim 3 wherein the diameter of said two parallel holes exceeds the diameter of the line for suspending the object by between about 10 and 12%.

8. A mounting connector as claimed in claim 3 wherein said holes are at a separation between adjacent sides thereof of between 15 and 30% of the diameter of said holes.

9. A mounting connector as claimed in claim 8 wherein said body portion has a thickness of between about 30 and about 50% of the diameter of said holes.

10. A mounting connector as claimed in claim 1 wherein said connector includes a second double hook portion that is similarly configured but directed oppositely to said first double hook portion, said second double hook portion being oriented at and angular offset of approximately 90 degree with respect to said first double hook portion about the length direction of said double hook portion.

11. A mounting connector for suspending articles from an elongate support in the form of a life line, life rail, pulpit or pushpit of a boat said connector comprising:

a hook portion for engaging the elongate support and a body portion for connecting to a suspended article;

said hook portion comprising an inverted U-shape finger that terminates in a free end directed towards said body portion but separated from said body portion by an entry gap;

said finger defining a hook pocket that opens from said entry gap and extends away from said body portion to a closed end, each said hook pocket having a width sufficient to accommodate the elongate support and having a total length of at least twice the size of said entry gap;

said finger being configured to receive a blocking retainer inserted therethrough at a spacing from said closed end, such that when said connector is mounted by having the elongate support passed into said slot through said entry and moved to the end of said hook pocket, insertion of said blocking retainer is effective to prevent movement of elongate support back to said entry gap.

12. A mounting connector as claimed in claim 11 wherein said body portion has two parallel holes extending therethrough in a direction transverse to the length direction of the elongate support, said holes being configured to receive a line passed successively therethrough, said holes being closely spaced such that the line is sharply bent between the holes so as to bind with said holes when said holes are oriented substantially horizontally and an object is suspended on said line, the line being readily adjustable relative to said holes when the latter are oriented substantially vertically.

13. A mounting connector as claimed in claim 12 wherein at least one of said two parallel holes is surrounded at one end thereof by a rounded peripheral bead; and wherein said holes are at a separation between adjacent sides thereof of between 15 and 30% of the diameter of said holes.

14. A mounting connector as claimed in claim 12 wherein the diameter of said two parallel holes exceeds the diameter of the line for suspending the object by between about 5 and 15%, and wherein said body portion has a minimum thickness of between about 30 and about 50% of the diameter of said holes.

15. A mounting connector for suspending articles from an elongate support in the form of a life line, life rail, pulpit or pushpit of a boat said connector comprising:

a hook portion for engaging the elongate support and a body portion for connecting to a suspended article;

said hook portion comprising two inverted U-shaped fingers spaced from each other by a slot, each finger terminating in a free end directed towards said body portion but separated from said body portion by an entry gap;

each said finger defining a hook pocket that opens from said entry gap and extends away from said body portion to a closed end, each said hook pocket having a width sufficient to accommodate the elongate support, and each said hook pocket having a total length that exceeds the size of said entry gap;

said slot separating said fingers apart by a distance not less than said width, said fingers extending generally parallel to each other and being oppositely oriented so that said hook pockets are in relative alignment but said entry gaps are not;

the structure being such that said connector can be mounted by causing the elongate support to pass into said slot to a depth sufficient to align with said entry gaps, whereupon rotation of said connector relative to said elongate support brings the latter in alignment with said hook pockets so that the mounting connector can be fully engaged by moving it to position the elongate support in contact with the ends of said hook pockets;

wherein said body portion has two closely spaced parallel holes extending therethrough in a direction transverse to the length direction of the elongate support, said holes being configured to receive a line passed successively therethrough and sharply bent between said holes which are positioned and arranged so as to bind with said line when said holes are oriented substantially horizontally and an object is suspended on said line, the line being readily adjustable relative to said holes when the latter are oriented substantially vertically.

16. A mounting connector as claimed in claim 15 that is configured to receive a blocking retainer in said slot to prevent unintended disengagement of said connector.

17. A mounting connector as claimed in claim 16 wherein the wall of at least one finger defining said slot has a recess therein at a location spaced away from said free end and positioned to receive said blocking retainer that is insertable transversely through said slot to block the same, said recess being configured to interengage with the blocking retainer and being sized to accommodate a blocking retainer having a thickness exceeding that of the elongate support.

18. A mounting connector as claimed in claim 15 wherein at least one of said two parallel holes is surrounded at one end thereof by a rounded peripheral bead.

19. A mounting connector as claimed in claim 15 wherein the diameter of said two parallel holes exceeds the diameter of the line for suspending the object by between about 5 and 15%, and wherein said holes are at a separation between adjacent sides thereof of between 15 and 30% of the diameter of said holes.

20. A mounting connector as claimed in claim 15 wherein said body portion has a minimum thickness of between about 30 and about 50% of the diameter of said holes.

* * * * *